US009145863B2

(12) United States Patent
Melster et al.

(10) Patent No.: US 9,145,863 B2
(45) Date of Patent: Sep. 29, 2015

(54) SYSTEM AND METHOD FOR CONTROLLING AUTOMATIC SHUT-OFF OF AN ENGINE (71) Applicant: General Electric Company, Schenectady, NY (US)

(72) Inventors: Mikhail Melster, Hanover Park, IL (US); Robert Carmen Palanti, Melbourne, FL (US); Derek Kevin Woo, Melbourne, FL (US); Pritamkumar Gangwal, Bangalore (IN); Narendrasingh Puransingh Patnurkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/180,920

(22) Filed: Feb. 14, 2014

(65) Prior Publication Data

US 2014/0277846 A1 Sep. 18, 2014

Related U.S. Application Data (60) Provisional application No. 61/790,873, filed on Mar. 15, 2013.

(51) Int. Cl.
*G05D 1/00* (2006.01)
*G05D 3/00* (2006.01)
(Continued)

(52) U.S. Cl.
CPC ........ *F02N 11/0807* (2013.01); *F02N 11/0818* (2013.01); *Y02T 10/48* (2013.01)

(58) Field of Classification Search
CPC ... B61L 15/0027; B61L 15/25; B61L 25/026; B61L 27/0027; B61L 11/123; G06F 19/00; G06F 17/00; G06F 7/00; G06F 7/70; F02N 11/0811; F02N 11/103; F02N 11/10; F02N 19/001; F02N 15/10; Y02T 10/48; Y02T 10/123; Y02T 10/44; Y02T 10/144; Y02T 10/26; Y02T 10/24
USPC ............... 701/1, 20, 21, 26, 36, 24, 2, 70, 93, 701/113, 50, 115, 112
See application file for complete search history.

(56) References Cited

U.S. PATENT DOCUMENTS 5,720,455 A 2/1998 Kull et al.
5,738,311 A 4/1998 Fernandez
(Continued)

FOREIGN PATENT DOCUMENTS

WO WO9960735 A1 11/1999
WO WO2010039680 A1 4/2010
ZA 200101708 A 8/2001

*Primary Examiner* — Calvin Cheung
*Assistant Examiner* — Luis A Martinez Borrero
(74) *Attorney, Agent, or Firm* — GE Global Patent Operation (57) ABSTRACT A method for controlling automatic shut off of an engine includes determining if a control system of a propulsion-generating vehicle is operating in a remote control mode or an onboard control mode. The operations of the vehicle are remotely controlled from an off-board source when the control system is in the remote control mode. The operations of the vehicle are controlled from onboard the vehicle when the control system is in the onboard control mode. The method also includes deactivating an automatic engine start-stop (AESS) device responsive to the control system being in or switched to the remote control mode. The AESS device automatically turns off an engine of the vehicle when operations of the engine are below one or more designated thresholds for at least a designated period of time. The AESS device is prevented from automatically turning the engine off when the AESS device is deactivated.

18 Claims, 4 Drawing Sheets (51) Int. Cl.
  *G06F 7/00* (2006.01)
  *G06F 17/00* (2006.01)
  *F02N 11/08* (2006.01)

(56) References Cited

U.S. PATENT DOCUMENTS

| | | | |
|---|---|---|---|
| 5,740,547 A | 4/1998 | Kull et al. | |
| 5,785,392 A | 7/1998 | Hart | |
| 5,813,635 A | 9/1998 | Fernandez | |
| 5,820,226 A | 10/1998 | Hart | |
| 5,833,325 A | 11/1998 | Hart | |
| 5,927,822 A | 7/1999 | Hart | |
| 5,934,764 A | 8/1999 | Dimsa et al. | |
| 5,950,967 A | 9/1999 | Montgomery | |
| 5,969,643 A | 10/1999 | Curtis | |
| 5,978,718 A | 11/1999 | Kull | |
| 5,986,577 A | 11/1999 | Bezos | |
| 5,986,579 A | 11/1999 | Halvorson | |
| 5,995,881 A | 11/1999 | Kull | |
| 6,114,974 A | 9/2000 | Halvorson | |
| 6,128,558 A | 10/2000 | Kernwein | |
| 6,163,089 A | 12/2000 | Kull | |
| 6,216,095 B1 | 4/2001 | Glista | |
| 6,275,165 B1 | 8/2001 | Bezos | |
| 6,322,025 B1 | 11/2001 | Colbert et al. | |
| 6,360,998 B1 | 3/2002 | Halvorson et al. | |
| 6,377,215 B1 | 4/2002 | Halvorson et al. | |
| 6,782,044 B1 | 8/2004 | Wright et al. | |
| 6,789,004 B2 * | 9/2004 | Brousseau et al. | 701/19 |
| RE39,011 E * | 3/2006 | Horst et al. | 246/187 A |
| 7,120,428 B2 * | 10/2006 | Higgs | 455/418 |
| 7,140,477 B2 * | 11/2006 | Engle et al. | 188/265 |
| 7,233,844 B2 * | 6/2007 | Peltz et al. | 701/19 |
| RE39,758 E * | 8/2007 | Horst et al. | 246/187 A |
| 7,416,262 B2 | 8/2008 | Ring | |
| 7,441,727 B2 * | 10/2008 | Sharkey et al. | 246/125 |
| 7,529,201 B2 * | 5/2009 | Aiken et al. | 370/278 |
| 7,770,847 B1 * | 8/2010 | Severson | 246/3 |
| 7,792,089 B2 * | 9/2010 | Aiken et al. | 370/347 |
| 8,123,305 B2 * | 2/2012 | Root et al. | 303/7 |
| 8,157,218 B2 | 4/2012 | Riley et al. | |
| 8,290,646 B2 * | 10/2012 | Ecton et al. | 701/19 |
| 8,310,979 B2 | 11/2012 | Mason | |
| 8,328,144 B2 | 12/2012 | Smith | |
| 8,328,145 B2 | 12/2012 | Smith | |
| 8,332,086 B2 * | 12/2012 | Muinonen et al. | 701/19 |
| 8,364,338 B2 | 1/2013 | Peltonen | |
| 8,428,798 B2 | 4/2013 | Kull | |
| 2002/0193918 A1 * | 12/2002 | Horst | 701/19 |
| 2003/0135321 A1 * | 7/2003 | Kumazaki et al. | 701/112 |
| 2003/0173124 A1 * | 9/2003 | Okada et al. | 180/65.2 |
| 2003/0178534 A1 * | 9/2003 | Peltz et al. | 246/187 A |
| 2004/0122586 A1 * | 6/2004 | Wolf et al. | 701/112 |
| 2005/0010338 A1 * | 1/2005 | Kraeling et al. | 701/19 |
| 2005/0121971 A1 | 6/2005 | Ring | |
| 2006/0116797 A1 * | 6/2006 | Moran | 701/22 |
| 2007/0124037 A1 * | 5/2007 | Moran | 701/22 |
| 2008/0208401 A1 * | 8/2008 | Kumar et al. | 701/19 |
| 2008/0287074 A1 * | 11/2008 | Grunhold | 455/90.2 |
| 2009/0186325 A1 * | 7/2009 | Kumar | 434/219 |
| 2009/0234521 A1 * | 9/2009 | Kumar et al. | 701/19 |
| 2010/0025131 A1 * | 2/2010 | Gloceri et al. | 180/65.28 |
| 2010/0130124 A1 | 5/2010 | Teeter et al. | |
| 2010/0145562 A1 * | 6/2010 | Moran | 701/22 |
| 2010/0152995 A1 * | 6/2010 | Baumann et al. | 701/112 |
| 2010/0204858 A1 | 8/2010 | Bryant | |
| 2011/0238284 A1 * | 9/2011 | Bollig et al. | 701/113 |
| 2012/0143407 A1 * | 6/2012 | Murthy | 701/19 |

* cited by examiner

SYSTEM AND METHOD FOR CONTROLLING AUTOMATIC SHUT-OFF OF AN ENGINE

CROSS-REFERENCE TO RELATED APPLICATIONS

This application claims the benefit of U.S. Provisional Application No. 61/790,873, filed Mar. 15, 2013, the entire disclosure of which is incorporated by reference.

FIELD

Embodiments of the inventive subject matter described herein relate to controlling when a vehicle automatically shuts off (e.g., turns off or otherwise deactivates) an engine of the vehicle.

BACKGROUND

Known rail vehicle consists (e.g., trains) include automatic engine start/stop (AESS) devices that automatically turn off engines of the train when the engines have been in idle for at least a designated time period. These devices are used to conserve fuel when the engines are not being actively used to propel the consists for at least the designated time period.

At times, operators of the consists may relinquish control of the consists to a remote location (e.g., a control tower in a rail yard) so that the operators can add or remove cars to the consists, setup the locomotives for an upcoming trip, or the like. During these operations, the engines of the locomotives typically are placed in idle. Due to the length of time needed to perform these operations, however, the engines may automatically be turned off by the AESS devices. The operators may need to repeatedly manually restart the engines.

Currently, due to the manual intervention required to reactivate engines of the vehicles in a vehicle system during operations where the vehicles are remotely controlled, many operators are known to turn off AESS devices off while operating in both the onboard control mode and the remote control mode. As a result, the engines of a vehicle system may needlessly remain in idle or another low output mode when in onboard control mode and end up wasting fuel.

BRIEF DESCRIPTION

In an embodiment, a method (e.g., for controlling automatic shut off of an engine of a vehicle system) includes determining if a control system of a propulsion-generating vehicle is operating in a remote control mode or an onboard control mode. The operations of the vehicle are remotely controlled from an off-board source when the control system is in the remote control mode. The operations of the vehicle are controlled from onboard the vehicle when the control system is in the onboard control mode. The method also includes deactivating an automatic engine start-stop (AESS) device responsive to the control system being in or switched to the remote control mode. The AESS device is configured to automatically turn off an engine of the vehicle when operations of the engine are below one or more designated thresholds for at least a designated period of time. The AESS device is prevented from automatically turning the engine off when the AESS device is deactivated.

In an embodiment, a system (e.g., a control system for a vehicle system) includes a controller that is configured to be disposed onboard a vehicle system having at least one propulsion-generating vehicle with an engine. The controller also is configured to determine if the at least one propulsion-generating vehicle is operating in a remote control mode or an onboard control mode. Operations of the at least one propulsion-generating vehicle are remotely controlled from an off-board source when the control system is in the remote control mode. The operations of the at least one propulsion-generating vehicle are controlled from onboard the vehicle when the control system is in the onboard control mode. The controller also is configured to deactivate an automatic engine start-stop (AESS) device responsive to the at least one propulsion-generating vehicle being in or switched to the remote control mode. The AESS device is configured to automatically turn off an engine of the at least one propulsion-generating vehicle when operations of the engine are below one or more designated thresholds for at least a designated period of time. The AESS device is prevented from automatically turning the engine off when the AESS device is deactivated.

BRIEF DESCRIPTION OF THE DRAWINGS

Reference is now made briefly to the accompanying drawings, in which.

DETAILED DESCRIPTION

In accordance with one or more embodiments described herein, systems and methods are provided for automatically controlling when a vehicle switches operating states, with one operating state causing an engine of the vehicle to automatically shut off or shut down (e.g., deactivate) when the engine is in idle for at least a predetermine time period and another operating state preventing the engine from automatically shutting off or shutting down even if the engine is in idle for at least the predetermined time period, depending on a control mode of the vehicle. The control mode of the vehicle may represent who or what is controlling operations of the vehicle. For example, one control state may be a remote control mode (also referred to as a tower control mode), where tractive and/or braking operations of the vehicle are remotely controlled from a location that is outside and off-board the vehicle, such as a stationary control center (e.g., tower) of a vehicle yard (e.g., a rail yard tower of a rail switching yard), dispatch center, on the ground outside the vehicle (e.g., by an operator using a handheld operator control unit), or the like. Optionally, the off-board source of control may be a portable handheld remote control unit. Another control mode may be an onboard control mode, where the tractive and/or braking operations of the vehicle are controlled from a location that is onboard the vehicle (e.g., from input provided by an operator disposed onboard the vehicle and/or an onboard, automated control system).

In one aspect, the inventive subject matter described herein relates to an improved automatic engine start-stop (AESS) strategy for vehicle systems, such as locomotive consists or locomotives distributed in a rail vehicle system (e.g., a train). Optionally, one or more embodiments described herein may relate to vehicle systems (e.g., one or more vehicles connected together to travel as a unit) other than locomotives and rail vehicle systems. Systems and methods described herein can distinguish between when the vehicle system is operating in the remote control mode or the onboard control mode and, in an automatic way, take specific actions in sequencing AESS strategy, such as by bypassing or re-enabling AESS functionalities at certain times. In either or both of the remote or onboard control modes, the vehicle system may operate in a distributed power (DP) manner, such as where the tractive and/or braking efforts of two or more propulsion-generating vehicles (e.g., locomotives) in the vehicle system are coordinated and/or based on each other.

In embodiment, when there is a transition between the control modes (e.g., from the onboard control mode to the remote control mode, or from the remote control mode to the onboard control mode), appropriate checks can be put in place to establish initial conditions and sequencing for the AESS. For example, when an AESS device of the vehicle is active during operation according to the onboard control mode, the engine has been shut down by the AESS device, and the operator restarts the engine for operating in the remote control mode, the system and method described herein can recognize that the vehicle is now operating in the remote control mode and prevent the AESS device from shutting down the engine, even when the operations of the vehicle would otherwise cause the AESS device to shut down the engine. Similarly, a transition from remote control mode to onboard control mode may cause the AESS device to be activated or otherwise allowed to shut down the engine (if the operations of the engine are within thresholds or ranges used by the AESS device to determine when to shut off the engine).

Currently, due to the manual intervention required to reactivate engines of the vehicles in a vehicle system during operations where the vehicles are remotely controlled, many operators are known to turn off AESS devices off while operating in both the onboard control mode and the remote control mode. As a result, the engines of a vehicle system may needlessly remain in idle or another low output mode when in onboard control mode and end up wasting fuel. An embodiment of the inventive subject matter described herein effectively increases the opportunities to automatically shut down engines operating in idle or other low output modes by allowing AESS devices to be active and functional during onboard control mode and to be automatically disabled during remote control modes. As a result, operators of vehicle systems may be less likely to manually turn off the AESS devices and leave the AES devices off when operating in the remote control mode (and then neglecting or forgetting to reactivate the AESS devices when the vehicle system returns to the onboard control mode).

By preventing the AESS devices from automatically shutting down engines of a vehicle system when the vehicle system is in the remote control mode, the amount of time needed to manage manifest operations of the vehicle systems may be reduced because the operators of the vehicle system may not need to repeatedly reactivate (e.g., turn on) engines that were automatically turned off by the AESS devices as the operator is managing the manifest operations (e.g., loading/unloading additional vehicles onto/from the vehicle system, loading/unloading cargo, rearranging vehicles, setting up the vehicles, etc.). This amount of time may be reduced because, for relatively long vehicle systems (e.g., very long trains), the operator may be saved from multiple walking trips along the length of the vehicle system to get onboard and turn on the various engines of the vehicle system. In one aspect, the transition between activating or deactivating the AESS devices may occur automatically so that the operator does not need to manually activate the AESS devices after the AESS devices have been deactivated and/or so that the operator does not need to manually deactivate the AESS devices.

Figure 1:
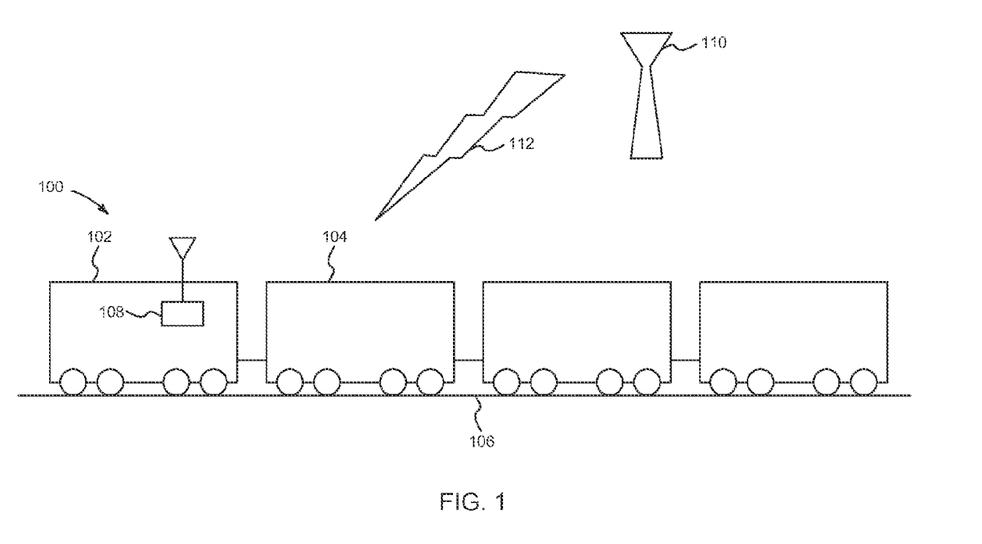
FIG. 1 is a schematic diagram of a vehicle system in accordance with an embodiment.

FIG. 1 is a schematic diagram of a vehicle system 100 in accordance with an embodiment. The vehicle system 100 is shown as a rail vehicle system, such as a consist or train, but alternatively may represent another type of vehicle system. The vehicle system 100 includes one or more propulsion-generating vehicles 102 connected with one or more non-propulsion-generating vehicles 104. The propulsion-generating vehicles 102 may represent a locomotive or other vehicle capable of generating tractive effort to propel the vehicles 102. The non-propulsion-generating vehicles 104 may represent a vehicle that is incapable of generating tractive effort to propel the vehicles 104, such as a rail car. The number and arrangement of vehicles 102, 104 shown in FIG. 1 is provided merely as an example and is not limiting on all embodiments of the inventive subject matter described herein. The vehicles 102, 104 are connected to form the system 100 and to travel along a route 106 (e.g., a track, road, waterway, or the like) as a unit.

The vehicle system 100 includes an onboard control system 108 that controls operations of the vehicle system 100. This control system 108 can control the tractive efforts and/or braking efforts of the vehicles 102 (and/or the braking efforts of the vehicles 104) based on operator input received from an operator disposed onboard the vehicle system 100 and/or from an off-board location 110, such as a control tower, dispatch facility, an operator using a remote operator control unit off board of the vehicle system 100, or the like. For example, the off-board location 110 may wirelessly transmit control signals 112 to the control system 108, which implements the control signals to control movement of the vehicle system 100.

Figure 2:
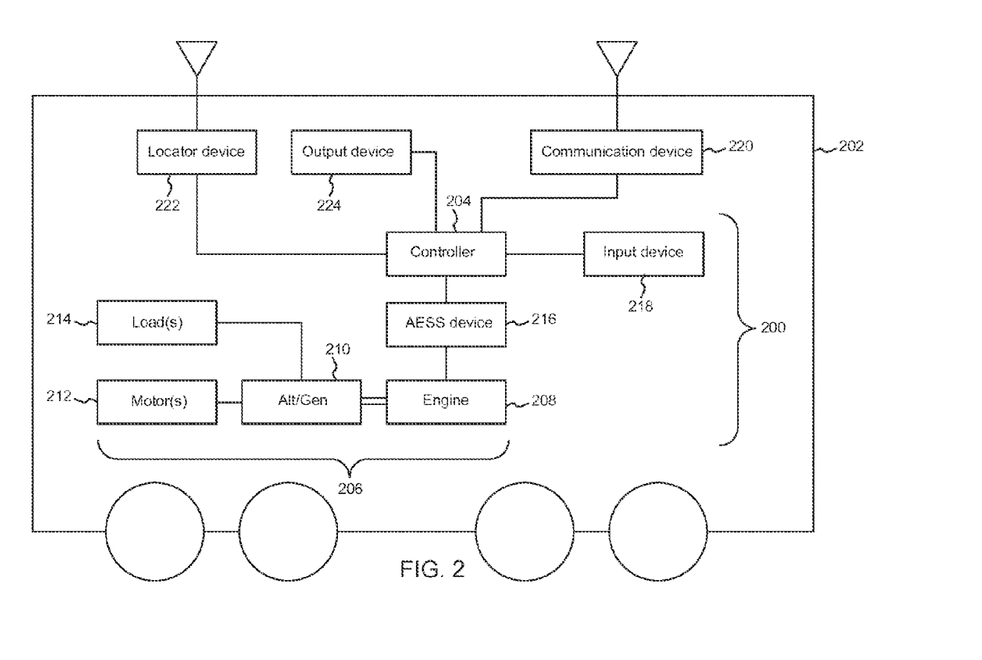
FIG. 2 illustrates a schematic diagram of an embodiment of a control system of a propulsion-generating vehicle.

FIG. 2 illustrates a schematic diagram of an embodiment of a control system 200 of a propulsion-generating vehicle 202. The propulsion-generating vehicle 202 may represent one or more of the propulsion-generating vehicles 102 shown in FIG. 1. The control system 200 includes a controller 204 that is used to control operations of a propulsion subsystem 206 of the vehicle 202. The controller 204 may represent one or more processors, microprocessors, controllers, microcontrollers, memories, and/or associated circuitry that generate control signals used for controlling the propulsion subsystem 206. The propulsion subsystem 206 generates propulsive force to propel the vehicle 202 along the route. In the illustrated embodiment, the propulsion subsystem 206 includes an engine 208 connected to an electric current generating device 210 (shown as "Alt/Gen" in FIG. 2), such as an alternator or generator, by a shaft. The engine 208 operates to cause the current generating device 210 to create electric current that is supplied to one or more traction motors 212 (shown as "Motor(s)" in FIG. 2) and/or other electric loads 214 (shown as "Load(s)") to power the motors 212 and/or loads 214. Optionally, the electric current that is created by the engine 208 and device 210 may be replaced or augmented with electric current supplied by an onboard energy storage device (e.g., one or more batteries) and/or an off board source of electric current, such as an electrified rail, overhead catenary, and the like.

The control system 200 includes an automatic engine start/stop device 216 (shown as "AESS Device") in FIG. 2. Although the AESS device 216 is shown as being disposed between the controller 204 and the engine 208, the AESS device 216 may be connected to the engine 208 in parallel with the controller 204. The AESS device 216 can represent one or more processors, microprocessors, controllers, microcontrollers, and/or other hardware or circuitry that perform operations described herein. The AESS device 216 operates to automatically shut off the engine 208 after operations of the engine 208 remain below one or more designated thresholds (or within one or more designated ranges) for at least a designated time period. For example, the AESS device 216 may receive operational data obtained from sensors (not shown) that measure the engine operating speed (e.g., the speed at which the engine 208 rotates), the engine lubricant (e.g., oil) temperature, the engine coolant temperature, the engine lubricant pressure, the air pressure in one or more brake lines of the vehicle system 100 (shown in FIG. 1) in which the vehicle 202 is included, and the like. If the operating speed is no greater than a designated threshold operating speed (such as when the engine 208 is operating in idle or another reduced throttle setting that does not propel the vehicle 202), the lubricant temperature is no greater than a designated threshold lubricant temperature, the coolant temperature is no greater than a designated threshold coolant pressure, the lubricant pressure is no greater than a designated threshold lubricant pressure, and/or the brake air pressure is greater than a designated threshold pressure for at least one or more designated time periods, the AESS device 216 may automatically turn off the engine 208.

In an embodiment, the controller 204 determines if the vehicle 202 is operating in a remote control mode or an onboard control mode and, based on this determination, autonomously activates or deactivates the AESS device 216. When the AESS device 216 is active, the AESS device 216 can automatically turn off the engine 208 as described above. When the AESS device 216 is deactivated, the AESS device 216 cannot turn the engine 208 off as described above. For example, the controller 204 may open a relay or switch disposed between the AESS device 216 and the engine 208 to prevent any command signals issued by the AESS device 216 from being received and acted upon to turn the engine 208 off. Optionally, the controller 204 may deactivate the AESS device 216 in another manner, such as by turning off the AESS device 216, instructing the AESS device 216 to not issue any command signals that would cause the engine 208 to turn off, or the like.

The controller 204 may determine the operating mode of the vehicle 202 in one or more ways. For example, an operator disposed onboard the vehicle 202 may use an input device 218 (e.g., a button, switch, lever, keyboard, electronic mouse, touchscreen, microphone, or the like) to switch the control system 200 from the remote control mode to the onboard control mode and/or from the onboard control mode to the remote control mode. The controller 204 may receive an instruction signal from a communication device 220 (e.g., an antenna with associated transceiver circuitry and hardware) that switches the control system 200 from the remote control mode to the onboard control mode and/or from the onboard control mode to the remote control mode. Such an instruction signal may be transmitted or broadcast from the remote location 110 (shown in FIG. 1) or from another source. The controller 204 may receive location data representative of a location of the vehicle 202 or vehicle system 100 from a locator device 222 (e.g., a Global Positioning System receiver) and, based on the location, determine if the control system 200 is to be operating in the onboard control mode or the remote control mode. For example, when the vehicle 202 and/or vehicle system 100 enters into a designated geographic area or boundary, the control system 200 may automatically switch from the onboard control mode to the remote control mode. When the vehicle 202 and/or vehicle system 100 exits the geographic area or boundary, the control system 200 may automatically switch from the remote control mode to the onboard control mode. The controller 204 may notify an operator of the vehicle 202 whether the vehicle 202 is operating in the remote control mode or the onboard control mode using an output device 224, such as a display device, acoustic speaker, haptic device, or the like. The controller 204 can notify the operator if the AESS device 216 is active or deactivated using the output device 224.

In an embodiment, the controller 204 may determine (or re-determine) the control mode of the vehicle 202 responsive to the engine 208 switching states. For example, when the engine 208 is activated after being turned off, the controller 204 may determine if the control system 200 is operating in the remote control mode or the onboard control mode and activate or deactivate the AESS device 216, as appropriate.

Figure 3:
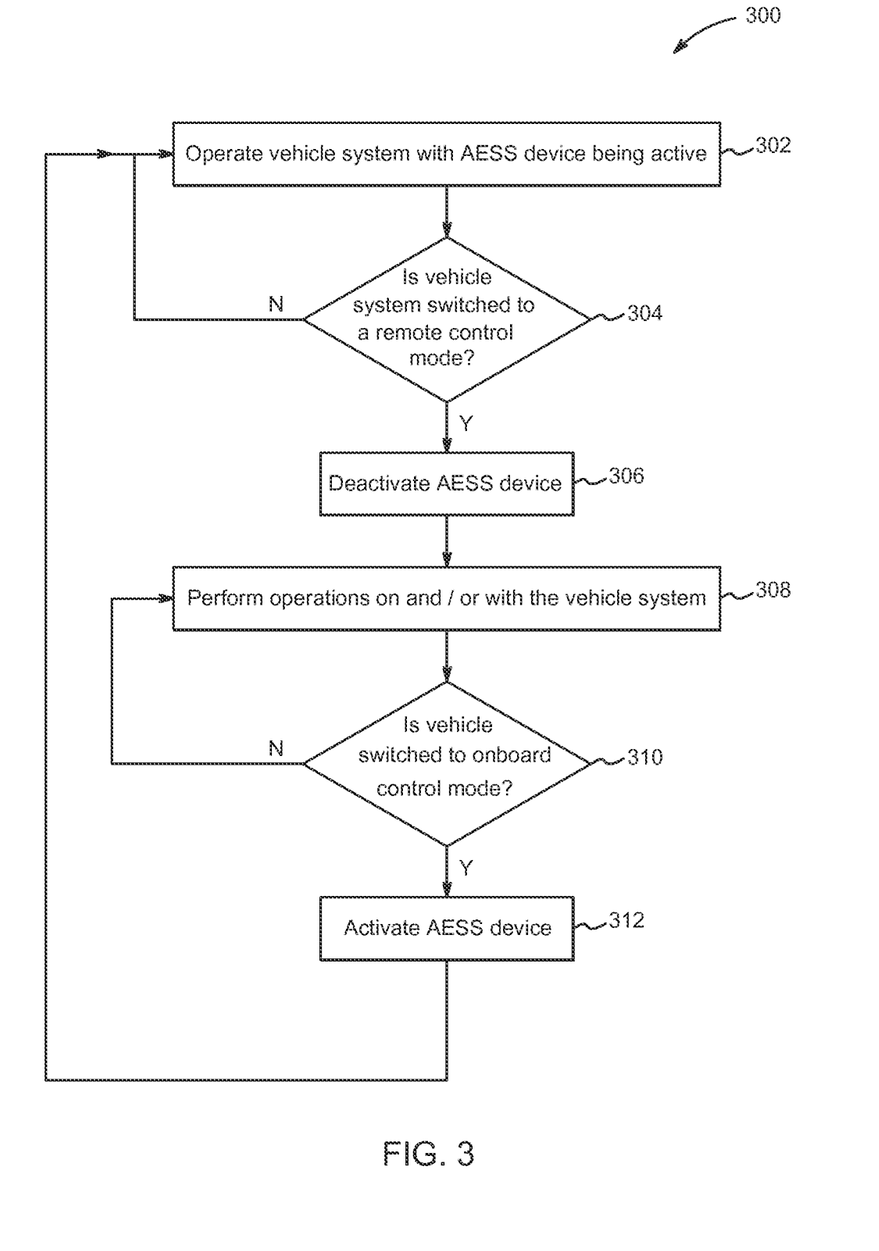
FIG. 3 is a flowchart of a method for controlling automatic shut off of an engine in a vehicle or vehicle system.

FIG. 3 is a flowchart of a method 300 for controlling automatic shut off of an engine in a vehicle or vehicle system. The method 300 may be used with the vehicle system 100 shown in FIG. 1, the vehicle 202 shown in FIG. 2, and/or the control system 200 shown in FIG. 2.

At 302, the vehicle system is operated with the AESS device being active. For example, the vehicle system may be traveling along a route with the AESS device activated such that the AESS device can turn off one or more engines of the vehicle system as described above. The vehicle system may be operating in an onboard control mode.

At 304, a determination is made as to whether the vehicle system and/or the control system is switched or has been switched to a remote control mode. For example, a determination may be made that the vehicle system is switched from the onboard control mode to a remote control mode responsive to input being received via an input device, an instruction received by the communication device, and/or the vehicle system entering into or leaving a designated area. If the vehicle system and/or control system has switched to the remote control mode, then the AESS device may need to be deactivated so that one or more operations can be performed with the engine(s) of the vehicle system operating in idle or another reduced state without the engine(s) being turned off. As a result, flow of the method 300 may proceed toward 306. On the other hand, if the vehicle system and/or control system continues to operate in the onboard control mode, then the AESS device may remain active. As a result, flow of the method 300 can return to 302 until operations of the vehicle system are completed.

At 306, the AESS device is deactivated. For example, the AESS device may be turned off, disconnected from the engine(s), or the like. At 308, operations are performed on and/or with the vehicle system while the AESS device is deactivated. For example, the engines of the vehicle system may be placed into idle for a prolonged period of time while one or more propulsion-generating and/or non-propulsion generating vehicles are added to or removed from the vehicle system, cargo or freight is added to or removed from the vehicle system, settings of the propulsion-generating vehicles are modified for an upcoming trip, or the like.

At 310, a determination is made as to whether the vehicle system and/or the control system is switched or has been switched to the onboard control mode. For example, a determination may be made that the vehicle system is switched from the remote control mode to the onboard control mode responsive to input being received via an input device, an instruction received by the communication device, and/or the vehicle system entering into or leaving a designated area. If the vehicle system and/or control system has switched to the onboard control mode, then the AESS device may need to be activated in order to conserve fuel. For example, the AESS device may be activated so that the AESS device can turn off the engine if the engine operates in idle for at least a designated time period. As a result, flow of the method 300 may proceed toward 312. On the other hand, if the vehicle system and/or control system continues to operate in the remote control mode, then the AESS device may remain deactivated. As a result, flow of the method 300 can return to 308 until operations of the vehicle system are completed or until the vehicle system and/or control system switches to the onboard control mode.

At 312, the AESS device is activated. For example, the AESS device may be turned on, connected with the engine(s), or the like. Flow of the method 300 may return to 302 until operations of the vehicle system are completed.

In one aspect, several propulsion-generating vehicles of a vehicle system may each include an AESS device, and these AESS devices may all be deactivated when the vehicle system (e.g., the propulsion-generating vehicles) is switched to the remote control mode. For example, all of the propulsion-generating vehicles may have their AESS devices deactivated when all or at least one of the propulsion-generating vehicles switches to the remote control mode.

The deactivation of an AESS device when the propulsion-generating vehicle having the AESS device is in the remote control mode may be at least temporarily overridden. For example, subsequent to the AESS device of a propulsion-generating vehicle being deactivated when the control system is in or switched to the remote control mode, the AESS device may be temporarily reactivated so that the AESS device can shut off the engine of the propulsion-generating vehicle. The AESS device may be temporarily reactivated despite the control system remaining in the remote control mode. For example, once the control system of the propulsion-generating vehicle enters the remote control mode, the AESS device of the vehicle may be deactivated, as described above. While the vehicle remains in the remote control mode, the AESS device may be reactivated responsive to the vehicle entering one designated area, the vehicle leaving another designated area, receipt of an override signal, or the like.

As one example of such reactivation of an AESS device, the AESS device of a propulsion-generating vehicle may be deactivated when the vehicle switches to the remote control mode. When the vehicle is moved to a designated parking area (e.g., in the yard), however, the AESS device may be reactivated so that the AESS device shuts down the engine of the vehicle if the vehicle remains in the parking area for longer than a designated time period. As another example, when the vehicle leaves the vehicle yard, the AESS device may be similarly reactivated so that the AESS device can shut down the engine (if circumstances dictate the shutting down of the engine). The AESS device may be turned back on if an override signal is generated, such as a signal that is generated in response to a designated failsafe time window being exceeded. For example, if the vehicle remains in the remote control mode for longer than a designated time (e.g., greater than one or two hours, or another length of time), then an override signal may be generated by the control system to automatically reactivate the AESS device. As another example, if the vehicle remains in the remote control mode beyond designated operational hours of a vehicle yard (e.g., the hours that the yard is open or another length of time), then an override signal may be generated by the control system to automatically reactivate the AESS device.

While the preceding description focuses on onboard components controlling deactivation and/or reactivation of an AESS device, one or more embodiments also may provide for the AESS device being remotely deactivated and/or reactivated. For example, the off-board location 110 may communicate (e.g., broadcast or transmit) a deactivation signal to the AESS device or the controller onboard a vehicle system to deactivate the AESS device.

Figure 4:
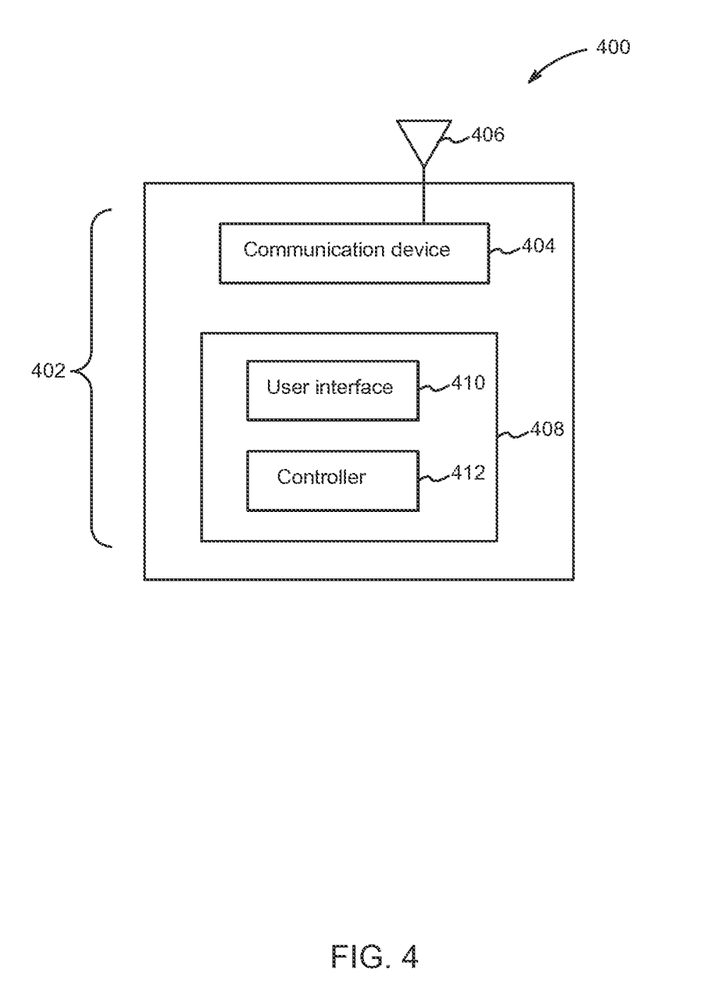
FIG. 4 illustrates a schematic diagram of an off-board location.

FIG. 4 illustrates a schematic diagram of an off-board location 400. The off-board location 400 may represent a control tower, facility, portable remote control unit, or the like, that remotely controls operations of the vehicle system 100. The off-board location 400 may represent the off-board location 110 shown in FIG. 1.

The off-board location 400 includes a control system 402 that operates to communicate with the vehicle system 100 in order to allow an operator of the control system 402 to remotely control tractive and/or braking operations of the vehicle system 100. The control system 402 includes a communication device 404 that communicates with the vehicle system 100. For example, the communication device 404 may be similar to the communication device 220 of the vehicle 202 and may wirelessly communicate with the vehicle 202 via the communication device 220. The communication device 404 includes an antenna 406 or other wireless transmitter or broadcaster for communicating (e.g., broadcasting, transmitting, and/or receiving) wireless signals with the communication device 220.

The control system 402 also includes a control unit 408 operably connected with the communication device 404 such that the control unit 408 can communicate signals with the vehicle system 100 using the communication device 404. For example, the communication device 404 and the control unit 406 may communicate with each other using one or more wired and/or wireless connections.

The control unit 408 includes or represents one or more processors, microprocessors, controllers, microcontrollers, memories, and/or associated circuitry that generate signals used for communicating with the vehicle system 100. The control unit 408 includes a user interface 410 and a controller 412. The user interface 410 includes or represents one or more input and/or output devices that allow the operator of the control system 402 to control the vehicle system 100. For example, the user interface 410 may include one or more keyboards, an electronic mouse, stylus, touchscreen, microphone, joystick, dials, buttons, switches, displays, speakers, or the like, that are used by the operator to change the tractive and/or braking efforts of the vehicle system 100. The operator may manually manipulate one or more of these components to provide user input. The controller 412 monitors this user input and generates corresponding control signals that are communicated to the vehicle system 100 via the communication device 404. The controller 412 may represent one or more processors, microprocessors, controllers, microcontrollers, memories, and/or associated circuitry that generate the control signals used for controlling the vehicle system 100 (e.g., the propulsion subsystem 206).

In one aspect, the control unit 408 can generate a switching signal for transmission (or other form of communication, such as broadcasting) by the communication device 404 to the vehicle system 100. The switching signal may be generated responsive to user input directing the control unit 408 to switch the vehicle system 100 into a remote control mode. This switching signal can direct one or more, or all, of the AESS devices in the vehicle system 100 to switch into the remote control mode for being controlled by the control unit 408. Responsive to receipt of this signal, the AESS devices are deactivated (e.g., turn OFF). As described above, when these devices are deactivated, the AESS devices no longer automatically turn off corresponding engines when operations of the engines are below one or more designated thresholds for at least a designated period of time.

The control unit 408 may generate a reactivation signal that is communicated to the vehicle system 100. The reactivation signal may direct the vehicle system 100 to reactivate the AESS device so that the AESS device can once again automatically turn off corresponding engines when operations of the engines are below one or more designated thresholds for at least a designated period of time.

In one aspect, the control unit 408 can transmit a deactivation signal to the vehicle system 100. This signal may direct one or more, or all, of the AESS devices onboard the vehicle system 100 to deactivate. The deactivation signal may deactivate the AESS devices without the vehicle system 100 being switched to a remote control mode.

In an embodiment, a method (e.g., for controlling automatic shut off of an engine of a vehicle system) includes determining if a control system of a propulsion-generating vehicle is operating in a remote control mode or an onboard control mode. The operations of the vehicle are remotely controlled from an off-board source when the control system is in the remote control mode. The operations of the vehicle are controlled from onboard the vehicle when the control system is in the onboard control mode. The method also includes deactivating an automatic engine start-stop (AESS) device responsive to the control system being in or switched to the remote control mode. The AESS device is configured to automatically turn off an engine of the vehicle when operations of the engine are below one or more designated thresholds for at least a designated period of time. The AESS device is prevented from automatically turning the engine off when the AESS device is deactivated.

In one aspect, deactivating the AESS device prevents the AESS device from turning off the engine regardless of the operations of the vehicle being below the one or more designated threshold for at least the designated period of time.

In one aspect, the method also includes activating the AESS device responsive to the control system switching from the remote control mode to the onboard control mode.

In one aspect, the control system receives control signals from the off-board source for remote control of the vehicle and the off-board source includes a stationary control center of a vehicle yard in which the vehicle travels.

In one aspect, the propulsion-generating vehicle is a locomotive, and the vehicle yard is a rail switching yard.

In one aspect, the control system receives control signals from the off-board source for remote control of the vehicle and the off-board source includes a portable handheld remote control unit.

In one aspect, the propulsion-generating vehicle is a first propulsion-generating vehicle of a vehicle consist comprising the first propulsion-generating vehicle and at least one second propulsion-generating vehicle. The method also can include, for each second propulsion-generating vehicle of the at least one second propulsion-generating vehicle: when the AESS device of the first propulsion-generating vehicle is deactivated responsive to the control system of the first propulsion-generating vehicle being in or switched to the remote control mode, also deactivating a respective automatic engine start-stop (AESS) device of the second propulsion-generating vehicle. The AESS device of the second propulsion-generating vehicle is prevented from automatically turning off a respective engine of the second propulsion-generating vehicle when the AESS device of the second propulsion-generating vehicle is deactivated.

In one aspect, the first propulsion-generating vehicle is a first locomotive, and each of the at least one second propulsion-generating vehicle is a respective second locomotive, and the vehicle consist is a train.

In one aspect, the method also includes, subsequent to deactivating the AESS device responsive to the control system being in or switched to the remote control mode, temporarily reactivating the AESS device despite the control system remaining in the remote control mode, responsive one or more of the vehicle entering a first designated area, the vehicle leaving a second designated area, or receipt of an override signal.

In an embodiment, a system (e.g., a control system for a vehicle system) includes a controller that is configured to be disposed onboard a vehicle system having at least one propulsion-generating vehicle with an engine. The controller also is configured to determine if the at least one propulsion-generating vehicle is operating in a remote control mode or an onboard control mode. Operations of the at least one propulsion-generating vehicle are remotely controlled from an off-board source when the at least one propulsion-generating vehicle is in the remote control mode. The operations of the at least one propulsion-generating vehicle are controlled from onboard the vehicle when the at least one propulsion-generating vehicle is in the onboard control mode. The controller also is configured to deactivate an automatic engine start-stop (AESS) device responsive to the at least one propulsion-generating vehicle being in or switched to the remote control mode. The AESS device is configured to automatically turn off an engine of the at least one propulsion-generating vehicle when operations of the engine are below one or more designated thresholds for at least a designated period of time. The AESS device is prevented from automatically turning the engine off when the AESS device is deactivated.

In one aspect, the controller is configured to deactivate the AESS device to prevent the AESS device from turning off the engine regardless of the operations of the at least one propulsion-generating vehicle being below the one or more designated threshold for at least the designated period of time.

In one aspect, the controller is configured to activate the AESS device responsive to the at least one propulsion-generating vehicle switching from the remote control mode to the onboard control mode.

In one aspect, the controller is configured to receive control signals from the off-board source for remote control of the at least one propulsion-generating vehicle and the off-board source includes a stationary control center of a vehicle yard in which the at least one propulsion-generating vehicle travels.

In one aspect, the at least one propulsion-generating vehicle is a locomotive, and the vehicle yard is a rail switching yard.

In one aspect, the controller is configured to receive control signals from the off-board source for remote control of the at least one propulsion-generating vehicle and the off-board source includes a portable handheld remote control unit. In one aspect, the at least one propulsion-generating vehicle includes first and second propulsion-generating vehicles of a vehicle consist. When the AESS device of the first propulsion-generating vehicle is deactivated responsive to the first propulsion-generating vehicle being in or switched to the remote control mode, the controller is configured to also deactivate a respective automatic engine start-stop (AESS) device of the second propulsion-generating vehicle. The AESS device of the second propulsion-generating vehicle is prevented from automatically turning off a respective engine of the second propulsion-generating vehicle when the AESS device of the second propulsion-generating vehicle is deactivated.

In one aspect, the first propulsion-generating vehicle is a first locomotive, and each of the at least one second propulsion-generating vehicle is a respective second locomotive, and the vehicle consist is a train.

In one aspect, subsequent to deactivating the AESS device responsive to the at least one propulsion-generating vehicle being in or switched to the remote control mode, the controller is configured to temporarily reactivate the AESS device despite the at least one propulsion-generating vehicle remaining in the remote control mode, responsive one or more of the at least one propulsion-generating vehicle entering a first designated area, the at least one propulsion-generating vehicle leaving a different, second designated area, or receipt of an override signal.

In an embodiment, a vehicle includes an engine, an automatic engine start-stop (AESS) device, and a controller. The AESS device is configured to automatically turn off the engine when operations of the engine are below one or more designated thresholds for at least a designated period of time. The controller is configured to determine if the vehicle is operating in a remote control mode or an onboard control mode. Operations of the vehicle are remotely controlled from an off-board source when the vehicle is in the remote control mode and the operations of vehicle are controlled from onboard the vehicle when in the onboard control mode. The controller also is configured to deactivate the AESS device responsive to the vehicle being in or switched to the remote control mode. The AESS device is prevented from automatically turning the engine off when the AESS device is deactivated.

In an embodiment, a control system includes a wireless communication device and a control unit. The control unit is operably connected to the wireless communication device and includes a user interface and a controller. The control unit is configured to remotely control a vehicle having an engine and to generate a first signal for transmission to the vehicle by the wireless communication device for switching the vehicle into a remote control mode for being controlled by the control unit. Additionally, the vehicle may be configured to deactivate an automatic engine start-stop (AESS) device of the vehicle responsive to receiving the first signal and/or the control unit is further configured to generate a second signal for transmission to the vehicle by the wireless communication device for deactivating the AESS device. The AESS device is configured to automatically turn off the engine when operations of the engine are below one or more designated thresholds for at least a designated period of time. The AESS device is prevented from automatically turning the engine off when the AESS device is deactivated.

In one aspect, the wireless communication device and the control unit are stationary and located in a control center of a vehicle yard in which the vehicle travels.

In another embodiment, a vehicle comprises an automatic engine start-stop (AESS) device configured to automatically turn off an engine of the vehicle when operations of the engine are below one or more designated thresholds for at least a designated period of time. The vehicle further comprises a controller configured to determine if the vehicle is operating in a remote control mode or an onboard control mode, operations of the vehicle being remotely controlled from an off-board source when the vehicle is in the remote control mode and the operations of vehicle being controlled from onboard the vehicle when in the onboard control mode. The controller is also configured to deactivate the AESS device responsive to the vehicle being in or switched to the remote control mode. (The AESS device is prevented from automatically turning the engine off when the AESS device is deactivated.)

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. At least one of the following claims may represent a claim to inventive subject matter of this patent application. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:

determining that a control system of a first propulsion-generating vehicle in a vehicle system is switched from operating in an onboard control mode to a remote control mode, the vehicle system including the first propulsion-generating vehicle and at least one second propulsion-generating vehicle, wherein one or more of tractive effort or braking effort generated by the first propulsion-generating vehicle are remotely controlled from an off-board source located off-board the vehicle system during a first time period that the control system is in the remote control mode and the one or more of tractive effort or braking effort generated by the first propulsion-generating vehicle are controlled from onboard the first propulsion-generating vehicle during a different, second time period that the control system is in the onboard control mode;

deactivating an automatic engine start-stop (AESS) device responsive to determining that the control system is switched from operating in the onboard control mode to the remote control mode, the AESS device configured to automatically turn off an engine of the first propulsion-generating vehicle responsive to operation of the engine being below one or more designated thresholds for at least a designated period of time, wherein the AESS device is prevented from automatically turning the engine off while the AESS device is deactivated; and subsequent to deactivating the AESS device responsive to the control system switching to the remote control mode, re-activating the AESS device despite the control system remaining in the remote control mode responsive to one or more of the first propulsion-generating vehicle entering a first designated area or the first propulsion-generating vehicle leaving a second designated area.

2. The method of claim 1, wherein deactivating the AESS device prevents the AESS device from turning off the engine regardless of the operation of the engine of the first propulsion-generating vehicle being below the one or more designated threshold for at least the designated period of time.

3. The method of claim 1, further comprising activating the AESS device responsive to the control system switching from the remote control mode to the onboard control mode.

4. The method of claim 1, further comprising the control system receiving control signals from the off-board source for remotely controlling the one or more of tractive effort or braking effort generated by the first propulsion-generating vehicle, wherein the off-board source comprises a stationary control center of a vehicle yard in which the vehicle system travels.

5. The method of claim 4, wherein the first propulsion-generating vehicle is a locomotive, and the vehicle yard is a rail switching yard.

6. The method of claim 1, further comprising receiving, at the control system, control signals from the off-board source for remotely controlling the one or more of tractive effort or braking effort generated by the first propulsion-generating vehicle, wherein the off-board source comprises a moveable and portable handheld remote control unit.

7. The method of claim 1, further comprising, for each second propulsion-generating vehicle of the at least one second propulsion-generating vehicle:

responsive to deactivating the AESS device of the first propulsion-generating vehicle responsive to the control system of the first propulsion-generating vehicle being switched to the remote control mode, also deactivating a respective automatic engine start-stop (AESS) device of each of the at least one second propulsion-generating vehicle, wherein the AESS device of the respective second propulsion-generating vehicle is prevented from automatically turning off a respective engine of the respective second propulsion-generating vehicle while the AESS device of the respective second propulsion-generating vehicle is deactivated.

8. The method of claim 1, wherein the first propulsion-generating vehicle is a first locomotive, and each of the at least one second propulsion-generating vehicle is a respective second locomotive, and the vehicle system is a train.

9. A system comprising:

a controller configured to be disposed onboard a vehicle system having a first propulsion-generating vehicle with an engine and at least one second propulsion-generating vehicle, the controller configured to determine that the first propulsion-generating vehicle is switched from operating in an onboard control mode to a remote control mode, wherein one or more of tractive effort or braking effort that is generated by the first propulsion-generating vehicle are remotely controlled from an off-board source that is located off-board the vehicle system during a first time period that the first propulsion-generating vehicle is in the remote control mode and the one or more of tractive effort or braking effort that is generated by the first propulsion-generating vehicle are controlled from onboard the first propulsion-generating vehicle during a different, second time period that the first propulsion-generating vehicle is in the onboard control mode, the controller also configured to deactivate an automatic engine start-stop (AESS) device responsive to the first propulsion-generating vehicle switching to the remote control mode from the onboard control mode, the AESS device configured to automatically turn off an engine of the first propulsion-generating vehicle while operation of the engine is below one or more designated thresholds for at least a designated period of time, wherein the AESS device is prevented from automatically turning the engine off while the AESS device is deactivated, and wherein, subsequent to deactivating the AESS device responsive to the first propulsion-generating vehicle switching to the remote control mode from the onboard control mode, the controller is configured to re-activate the AESS device despite the first propulsion-generating vehicle remaining in the remote control mode responsive to one or more of the first propulsion-generating vehicle entering a first designated area or the first propulsion-generating vehicle leaving a different, second designated area.

10. The system of claim 9, wherein the controller is configured to deactivate the AESS device to prevent the AESS device from turning off the engine regardless of the operation of the engine being below the one or more designated threshold for at least the designated period of time.

11. The system of claim 9, wherein the controller is configured to activate the AESS device responsive to the first propulsion-generating vehicle switching from the remote control mode to the onboard control mode.

12. The system of claim 9, wherein the controller is configured to receive control signals from the off-board source for remote control of the one or more of tractive effort or braking effort generated by the first propulsion-generating vehicle, wherein the off-board source comprises a stationary control center of a vehicle yard in which the vehicle system travels.

13. The system of claim 12, wherein the first propulsion-generating vehicle is a locomotive, and the vehicle yard is a rail switching yard.

14. The system of claim 9, wherein the controller is configured to receive control signals from the off-board source for remotely controlling the one or more of tractive effort or braking effort generated by the first propulsion-generating vehicle, wherein the off-board source comprises a moveable and portable handheld remote control unit.

15. The system of claim 9, wherein, while the AESS device of the first propulsion-generating vehicle is deactivated responsive to the first propulsion-generating vehicle switching to the remote control mode from the onboard control mode, the controller is configured to also deactivate a respective automatic engine start-stop (AESS) device of each of the at least one second propulsion-generating vehicle, wherein the AESS device of each of the at least one second propulsion-generating vehicle is prevented from automatically turning off a respective engine of the respective second propulsion-generating vehicle while the AESS device of the respective second propulsion-generating vehicle is deactivated.

16. The system of claim 9, wherein the first propulsion-generating vehicle is a first locomotive, and each of the at least one second propulsion-generating vehicle is a respective second locomotive, and the vehicle consist is a train.

17. A control system comprising:
a wireless communication device; and
a control unit operably connected to the wireless communication device, the control unit comprising a user interface and a controller, and the control unit configured to remotely control one or more of tractive effort or braking effort of a vehicle having an engine while the control unit is disposed off-board the vehicle;
wherein the control unit is further configured to generate a first signal for transmission to the vehicle by the wireless communication device for switching the vehicle into a remote control mode from an onboard control mode for the one or more of tractive effort or braking effort of the vehicle to be remotely controlled by the control unit, and wherein at least one of:
the vehicle is configured to deactivate an automatic engine start-stop (AESS) device of the vehicle responsive to receiving the first signal, the AESS device configured to automatically turn off the engine when operations of the engine are below one or more designated thresholds for at least a designated period of time, wherein the AESS device is prevented from automatically turning the engine off when the AESS device is deactivated; or
the control unit is further configured to generate a second signal for transmission to the vehicle system by the wireless communication device for deactivating the AESS device,
wherein, subsequent to deactivating the AESS device, the control unit is configured to re-activate the AESS device despite the vehicle remaining in the remote control mode by communicating an override signal to the vehicle.

18. The control system of claim 17, wherein the wireless communication device and the control unit are handheld and moveable relative to the vehicle.

* * * * *